(12) United States Patent
Kumar et al.

(10) Patent No.: US 12,399,627 B2
(45) Date of Patent: Aug. 26, 2025

(54) SYSTEM AND METHOD FOR ON-DISK WRITE JOURNALING IN LOGICAL DEVICES

(71) Applicant: Avago Technologies International Sales Pte. Limited, Singapore (SG)

(72) Inventors: Amar Deep Kumar, Bangalore (IN); Arun Prakash Jana, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/361,633

(22) Filed: Jul. 28, 2023

(65) Prior Publication Data
US 2025/0036290 A1 Jan. 30, 2025

(51) Int. Cl.
*G06F 3/06* (2006.01)
(52) U.S. Cl.
CPC .......... *G06F 3/0619* (2013.01); *G06F 3/0638* (2013.01); *G06F 3/064* (2013.01); *G06F 3/0689* (2013.01)
(58) Field of Classification Search
CPC ...... G06F 3/0619; G06F 3/0638; G06F 3/064; G06F 3/0689
See application file for complete search history.

(56) References Cited

U.S. PATENT DOCUMENTS

| | | | | |
|---|---|---|---|---|
| 6,067,635 A | * | 5/2000 | DeKoning | G06F 11/1084 711/155 |
| 2014/0173186 A1 | | 6/2014 | Randall et al. | |
| 2020/0057562 A1 | * | 2/2020 | Lee | G06F 3/0608 |
| 2020/0379646 A1 | * | 12/2020 | Blau | G06F 11/301 |

OTHER PUBLICATIONS

Foreign Search Report on non-Foley case related to US Dtd Dec. 13, 2024.

* cited by examiner

*Primary Examiner* — Chie Yew
(74) *Attorney, Agent, or Firm* — Foley & Lardner LLP

(57) ABSTRACT

A system may include one or more processors configured to receive a write operation to write a block of data to a logical device established using one or more storage devices which reserve one or more data strips and one or more metadata blocks to store data of write journals. The one or more processors may identify a first data strip of the block of data to be written to a first storage device of the one or more storage devices, write a copy of the first data strip to a data strip of the one or more data strips reserved on the first storage device, write metadata relating to the block of data to a metadata block of the one or more metadata blocks reserved on the first storage device, and execute the write operation to store the block of data across the one or more storage devices.

16 Claims, 9 Drawing Sheets

| WJ Metadata Block Number 410 | WJ Index 420 | LD ID 430 | LD Span 440 | User Data Stripe Number 450 | Validity Information 405 |||
|---|---|---|---|---|---|---|---|
| | | | | | ARM[0] 460 | ARM[1] 470 | ARM[2] 480 |
| WJ MD Block 2 | 2 | Invalid LD ID | N/A | N/A | N/A | N/A | N/A |
| ⋮ | ⋮ | ⋮ | ⋮ | ⋮ | ⋮ | ⋮ | ⋮ |
| WJ MD Block M | M | 0 | 0 | 100 | 470-M | 480-M | 490-M |

FIG. 4B

SYSTEM AND METHOD FOR ON-DISK WRITE JOURNALING IN LOGICAL DEVICES

FIELD OF THE DISCLOSURE

This disclosure generally relates to systems and methods for write journaling in a logical device, and more particularly to providing on-disk write journaling without battery backup.

BACKGROUND

Redundant array of independent disks (RAID) can provide data redundancy using data mirroring and/or data parity. RAID may store the user data striped across participating disks and keep the mirror and/or parity data consistent to help in recovering data from a failed disk. A RAID controller may perform the job of striping data and updating parity whenever user data is written on a logical disk (or logical device). In this manner, RAID can keep the parity in synchronization with the data, which is helpful in regenerating the data in case any of the disks fail. In case of a double failure, e.g., a disk failure following a controller power failure, the parity may be in an inconsistent state. Inconsistent parity cannot be reliably used for recovery in case of disk failure.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 4A and FIG. 4B are schematic block diagrams of a layout of metadata blocks for write journals, in accordance with an embodiment.

Figure 1A:
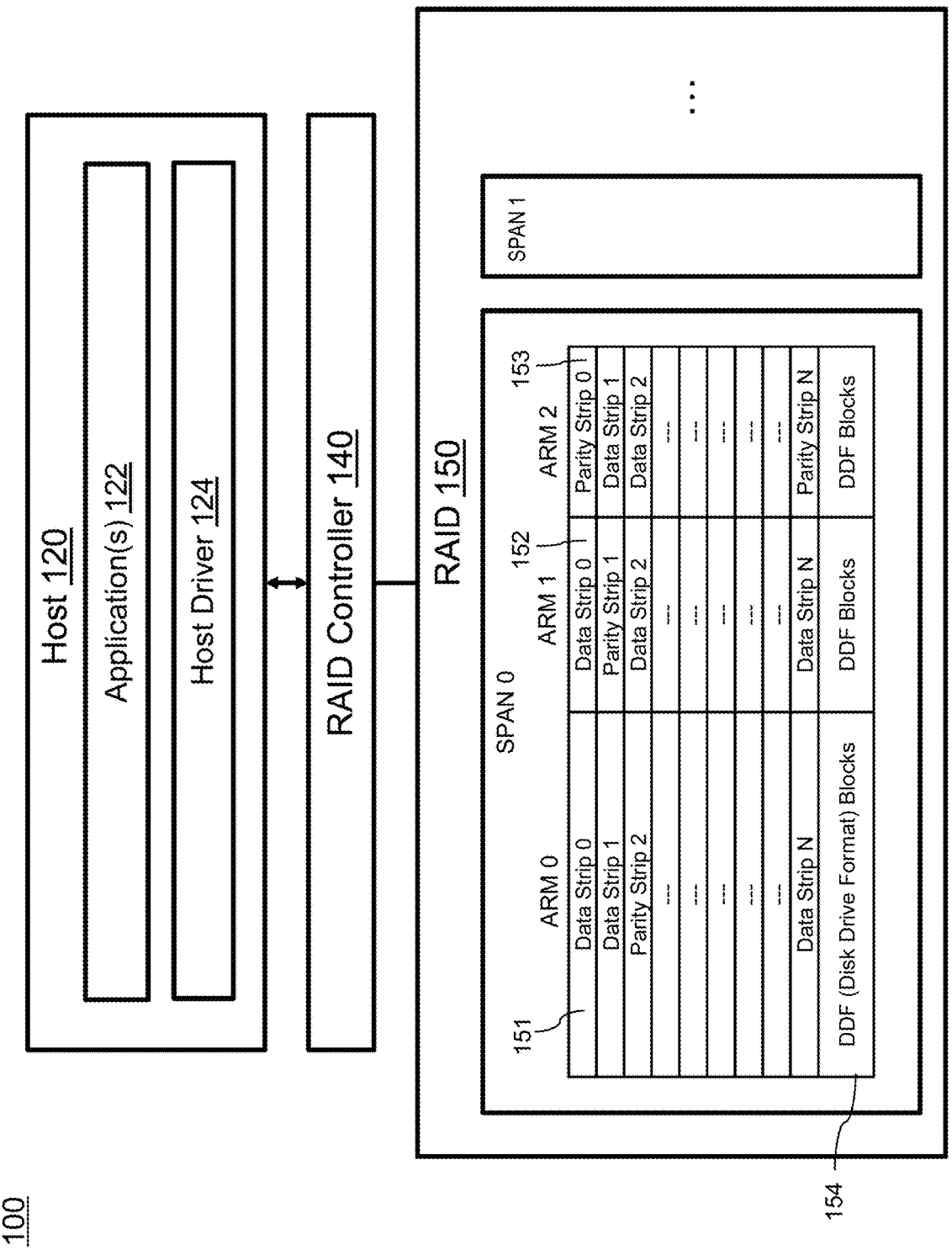
FIG. 1A is a schematic block diagram of a system including an example RAID configuration, in accordance with an embodiment.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

Various embodiments disclosed herein are related to a system including one or more processors configured to receive a write operation to write a block of data to a logical device established using one or more storage devices. In some embodiments, the logical device may be established by forming, defining, or representing the logical device (or a range of blocks of data) across the one or more storage devices. In some embodiments, the block of data may be a sequence of bytes or bits of data, or any data that is structured logically or physically. In some embodiments, the storage device may be one or more volatile memory devices, one or more non-volatile memory devices, one or more magnetic disks, one or more magneto optical disks, one or more hard disk drives (HDD), one or more solid-state-drives (SSDs), RAID, or any device suitable for storing computer readable data. In some embodiments, the logical device (also referred to as "logical disk", "virtual device", or "virtual disk") may be a range of data (e.g., a range of consecutive blocks of data) that is stored in a storage device and is represented as or provided as a device to a host or a user. For example, in RAID, a logical device may refer to a range of consecutive stripes to represent a device to a host driver where a stripe is defined as a block of data across all spans in a RAID configuration. A span may be an array, and multiple spans can be combined to form a logical device with nested RAID levels. In other words, in RAID, logical devices may be formed across all spans in a RAID configuration.

The one or more storage devices may reserve one or more data strips and one or more metadata blocks to store data of write journals. In some embodiments, the one or more data strips and the one or more metadata blocks may be reserved by carving out, keeping, or saving a disk space for write journal data from the one or more storage devices. In some embodiments, the write journal may be a write-in-progress record or any one or more data records or blocks that keep track of one or more ongoing write transactions. In some embodiments, the one or more data strips may be one or more blocks of data in a logical device or a physical storage device. In RAID, a data strip may refer to a block of data in each arm of a RAID array (or array), such that data strips over the array of multiple arms form or define a data row. An arm may refer to a device used to form or define an array (used as an element of the array) in a RAID configuration.

The one or more processors may be configured to identify a first data strip of the block of data to be written to a first storage device of the one or more storage devices. The one or more processors may be configured to write a copy of the first data strip to a data strip of the one or more data strips reserved on the first storage device. The one or more processors may be configured to write metadata relating to the block of data to a metadata block of the one or more metadata blocks reserved on the first storage device. In some embodiments, the metadata block may include data that provides information about other data such as data of write journals, in a logical device or in a storage device. The one or more processors may be configured to execute the write operation to store the block of data across the one or more storage devices.

In some embodiments, in executing the write operation, the one or more processors may be configured to write the first data strip of the block of data at a location of the first storage device. The location of the first data strip written on the first storage device may be different from a location of the data strip of the one or more data strips reserved on the first storage device. In some embodiments, the location of the first data strip may be a location of blocks of data stored on a storage device using a logical block addressing (LBA), a linear addressing, a logical addressing, a physical addressing or any addressing scheme for the storage device.

In some embodiments, the metadata relating to the block of data may include location information of the block of data. In some embodiments, the location information of the block of data may be a location of blocks of data stored on a storage device using an LBA, a linear addressing, a logical addressing, a physical addressing or any addressing scheme for the storage device. In some embodiments, the first data strip of the block of data may include one of parity data or non-parity data. In some embodiments, the parity data may be data indicating whether the number of bits having a particular logical value (e.g., "1") in other data is even or odd, data indicating a result of XOR operation on other data, or any data used to verify the integrity of other data.

In some embodiments, the one or more processors may be configured to identify a second data strip of the block of data to be written to a second storage device of the one or more storage devices. The one or more processors may be configured to write a copy of the second data strip to a data strip of the one or more data strips reserved on the second storage device, and write the metadata relating to the block of data to a metadata block of the one or more metadata blocks reserved on the second storage device. In executing the write operation, the one or more processors may be configured to write the second data strip of the block of data at a location of the second storage device that is different from a location of the data strip of the one or more data strips reserved on the second storage device. The metadata may include first map data identifying which portion of the first storage device is to be modified due to the write operation, and second map data identifying which portion of the second storage device is to be modified due to the write operation. Each of the first map data and the second map data may be a bitmap. In some embodiments, map data may be data indicating a mapping from some domain (for example, blocks of data) to corresponding states of the domain (for example, bits indicating modification states of the blocks of data).

In some embodiments, the one or more processors may be configured to detect an inconsistent state of the one or more storage devices. In some embodiments, the inconsistent state of the one or more storage devices may indicate a state in which data on one of a plurality of redundant data blocks (e.g., data on a first data strip) is changed but data on another of the plurality of redundant data blocks (e.g., data on a second data strip) is not changed, or any state in which one or more blocks of data are not consistent with other one or more blocks of data in the one or more storage devices. In response to the detecting, the one or more processors may be configured to determine whether the metadata block is open or closed. In response to determining that the metadata block is open, the one or more processors may be configured to read the metadata block to obtain location information of the copy of the first data strip and the copy of the second data strip stored in the first storage device and the second storage device, respectively. The one or more processors may be configured to write, based on the location information, the copy of the first data strip to the first storage device and the copy of the second data strip to the second storage device. In response to writing the copy of the first data strip and the copy of the second data strip, the one or more processors may be configured to indicate the metadata block as closed.

Various embodiments disclosed herein are related to a method. The method includes receiving, by one or more processors, a write operation to write a block of data to a logical device established using one or more storage devices. The one or more storage devices may reserve one or more data strips and one or more metadata blocks to store data of write journals. The method may include identifying, by the one or more processors, a first data strip of the block of data to be written to a first storage device of the one or more storage devices. The method may include writing, by the one or more processors, a copy of the first data strip to a data strip of the one or more data strips reserved on the first storage device. The method may include writing, by the one or more processors, metadata relating to the block of data to a metadata block of the one or more metadata blocks reserved on the first storage device. The method may include executing, by the one or more processors, the write operation to store the block of data across the one or more storage devices.

In some embodiments, in executing the write operation, the one or more processors may write the first data strip of the block of data at a location of the first storage device that is different from a location of the data strip of the one or more data strips reserved on the first storage device. In some embodiments, the metadata relating to the block of data may include location information of the block of data. In some embodiments, the first data strip of the block of data may include one of parity data or non-parity data.

In some embodiments, the one or more processors may identify a second data strip of the block of data to be written to a second storage device of the one or more storage devices. The one or more processors may write a copy of the second data strip to a data strip of the one or more data strips reserved on the second storage device. The one or more processors may write the metadata relating to the block of data to a metadata block of the one or more metadata blocks reserved on the second storage device. In executing the write operation, the one or more processors may write the second data strip of the block of data at a location of the second storage device that is different from a location of the data strip of the one or more data strips reserved on the second storage device. The metadata may include first map data identifying which portion of the first storage device is to be modified due to the write operation, and second map data identifying which portion of the second storage device is to be modified due to the write operation. Each of the first map data and the second map data may be a bitmap.

In some embodiments, the one or more processors may detect an inconsistent state of the one or more storage devices. In response to the detecting, the one or more processors may determine whether the metadata block is open or closed. In response to determining that the metadata block is open, the one or more processors may read the metadata block to obtain location information of the copy of the first data strip and the copy of the second data strip stored in the first storage device and the second storage device, respectively. The one or more processors may write, based on the location information, the copy of the first data strip to the first storage device and the copy of the second data strip to the second storage device. In response to writing the copy of the first data strip and the copy of the second data strip, the one or more processors may indicate the metadata block as closed.

RAID (redundant array of independent disks; also referred to as "RAID array" or "array") can provide data redundancy using data mirroring and/or data parity. RAID may store the user data striped across participating disks and keep the mirror and/or parity data consistent to help in recovering data from a failed disk. Striping may be any operation that defines one or more blocks of data across an array (or multiple arrays) as a combined block of data (e.g., referred to as a "stripe"). A RAID controller may perform the job of striping data and updating parity whenever user data is written on a logical disk (or logical device). In this manner, RAID can keep the parity in synchronization with the data, which is helpful in regenerating the data in case any of the disks fail. In case of RAID 1 logical devices or disks (LD), data can be stored in a data arm (or data disk) and mirrored to a mirror arm. In some embodiments, the data arm may store original data, and the mirror arm may store a copy of the original data. In case of RAID 5 LD, data can be distributed and striped across multiple arms (or disks). Example configurations of a RAID system (e.g., RAID 5) are shown in FIG. 1A and FIG. 1B.

FIG. 1A is a schematic block diagram of a system 100 including an example RAID configuration, in accordance with an embodiment. The system 100 may include a host 120, a RAID controller 140, and RAID 150. Each of the host 120, the RAID controller 140 and the RAID 150 may have a configuration similar to that of a computing system in FIG. 1B, though they need not have all the components described with regard to FIG. 1B. The host 120 may include one or more applications 122 and a host driver 124. Each of the one or more applications 122 and the host driver 124 may be implemented in hardware, software, firmware, or any combination thereof. The one or more applications 122 can send commands to one or more logical devices or disks (LDs) or one or more physical devices or disks (PDs) in the RAID 150 via the host driver 124 and the RAID controller 140. During host-driver negotiation, the host driver 124 may allocate one or more host buffers in a memory (of the host) to transfer input, data and status between the applications and the RAID controller 140.

In some embodiments, the RAID 150 may include a single span 3 disk RAID 5 logical device (LD). That is, the RAID 150 may include a plurality of spans (e.g., span 0, span 1, span 2, each including 3 arms (or disks) such that a single span can form an LD. For example, span 0 may include arm 0, arm 1, and arm 2. Each arm may include N strips including data strips (e.g., data strip 151) and parity strips (e.g., parity strip 153), and disk drive format (DDF) blocks (e.g., DDF blocks 154). The DDF blocks 154 may contain metadata information on the LD (e.g., LD metadata information as per the SNIA [Storage Networking Industry Association] specification). Each data strip (e.g., data strip 0) may be distributed and stored over two arms (e.g., data strip 151 on arm 0 and data strip 152 on arm 1) and a parity strip (e.g., parity strip 153) corresponding to the data strip (e.g., data strip 0) may be stored on the remaining arm (e.g., arm 3). Data stored on span 0 may be mirrored on each of span 1 and span 2. A block of data across all spans (e.g., data strips 0 and parity strips 0 in spans 0-2) may form an LD stripe (e.g., stripe 0) such that the size of a stripe equals the number of arms times the size of strips.

Figure 1B:
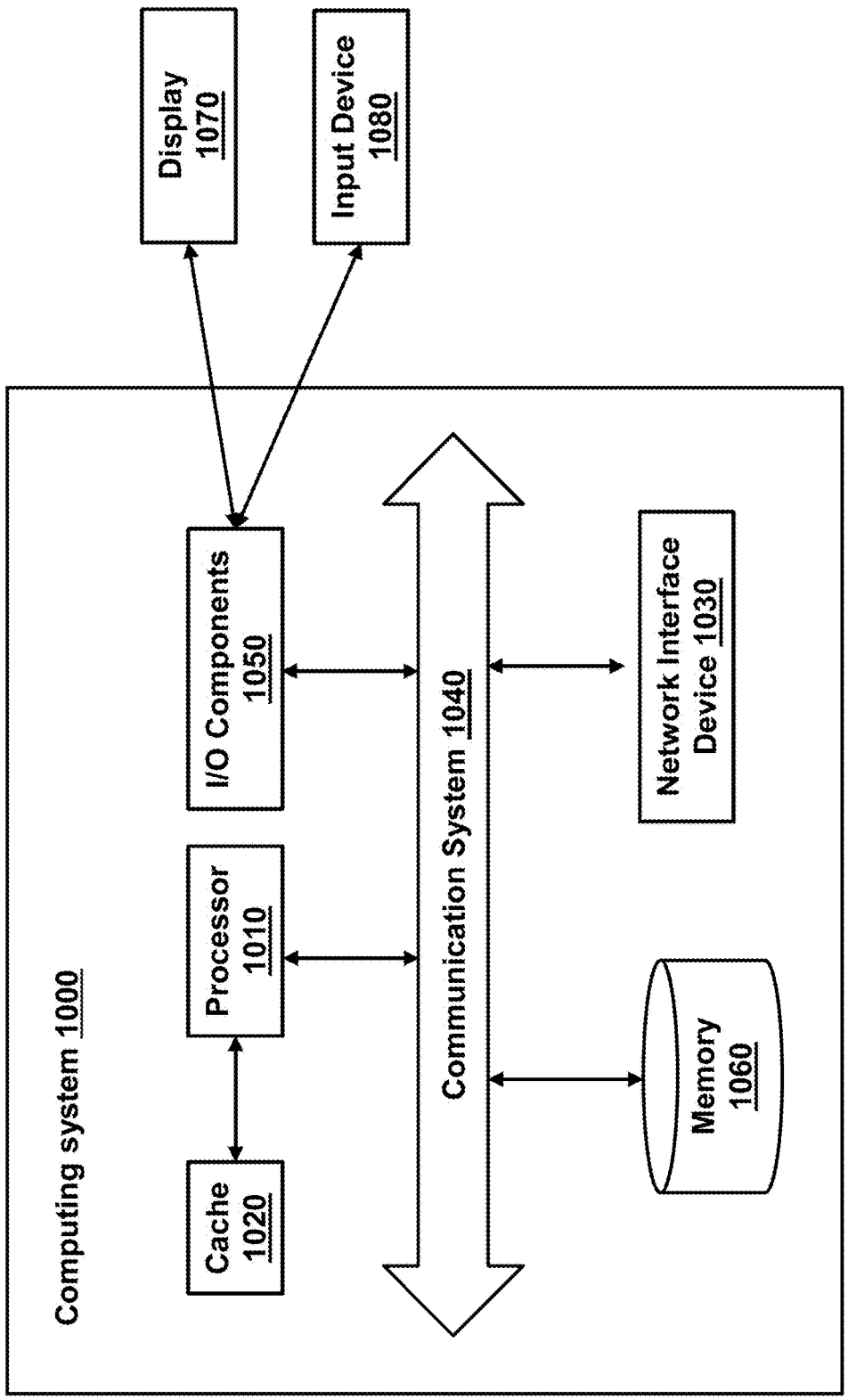
FIG. 1B is a schematic block diagram of a computing system, according to an embodiment.

FIG. 1B is a schematic block diagram of a computing system, according to an embodiment. An illustrated example computing system 1000 includes one or more processors 1010 in direct or indirect communication, via a communication system 1040 (e.g., bus), with memory 1060, at least one network interface controller 1030 with network interface port for connection to a network (not shown), and other components, e.g., input/output ("I/O") components 1050. Generally, the processor(s) 1010 will execute instructions (or computer programs) received from memory. The processor(s) 1010 illustrated incorporate, or are connected to, cache memory 1020. In some instances, instructions are read from memory 106 into cache memory 1020 and executed by the processor(s) 1010 from cache memory 1020. The computing system 1000 may not necessarily contain all of these components shown in FIG. 1B, and may contain other components that are not shown in FIG. 1B.

In more detail, the processor(s) 1010 may be any logic circuitry that processes instructions, e.g., instructions fetched from the memory 1060 or cache 1020. In many implementations, the processor(s) 1010 are microprocessor units or special purpose processors. The computing system 1000 may be based on any processor, or set of processors, capable of operating as described herein. The processor(s) 1010 may be single core or multi-core processor(s). The processor(s) 1010 may be multiple distinct processors.

The memory 1060 may be any device suitable for storing computer readable data. The memory 1060 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 1000 may have any number of memory devices 1060.

The cache memory 1020 is generally a form of computer memory placed in close proximity to the processor(s) 1010 for fast read times. In some implementations, the cache memory 1020 is part of, or on the same chip as, the processor(s) 1010. In some implementations, there are multiple levels of cache 1020, e.g., L2 and L3 cache layers.

The network interface controller 1030 manages data exchanges via the network interface (sometimes referred to as network interface ports). The network interface controller 1030 handles the physical and data link layers of the OSI model for network communication. In some implementations, some of the network interface controller's tasks are handled by one or more of the processor(s) 1010. In some implementations, the network interface controller 1030 is part of a processor 1010. In some implementations, the computing system 1000 has multiple network interfaces controlled by a single controller 1030. In some implementations, the computing system 1000 has multiple network interface controllers 1030. In some implementations, each network interface is a connection point for a physical network link (e.g., a cat-5 Ethernet link). In some implementations, the network interface controller 1030 supports wireless network connections and an interface port is a wireless (e.g., radio) receiver or transmitter (e.g., for any of the IEEE 802.11 protocols, near field communication "NFC", Bluetooth, ANT, or any other wireless protocol). In some implementations, the network interface controller 1030 implements one or more network protocols such as Ethernet. Generally, a computing system 1000 exchanges data with other computing devices via physical or wireless links through a network interface. The network interface may link directly to another device or to another device via an intermediary device, e.g., a network device such as a hub, a bridge, a switch, or a router, connecting the computing system 1000 to a data network such as the Internet.

The computing system 1000 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 1000 may include an interface (e.g., a universal serial bus (USB) interface) for connecting input devices, output devices, or additional memory devices (e.g., portable flash drive or external media drive). In some implementations, a computing system 1000 includes an additional device such as a co-processor, e.g., a math co-processor can assist the processor 1010 with high precision or complex calculations.

The components 1050 may be configured to connect with external media, a display 1070, an input device 1080 or any other components in the computing system 1000, or combinations thereof. The display 1070 may be a liquid crystal display (LCD), an organic light emitting diode (OLED) display, a flat panel display, a solid state display, a cathode ray tube (CRT) display, a projector, a printer or other now known or later developed display device for outputting determined information. The display 1070 may act as an interface for the user to see the functioning of the processor (s) 1010, or specifically as an interface with the software stored in the memory 1060.

The input device 1080 may be configured to allow a user to interact with any of the components of the computing system 1000. The input device 1080 may be a plurality pad, a keyboard, a cursor control device, such as a mouse, or a joystick. Also, the input device 1080 may be a remote control, touchscreen display (which may be a combination of the display 1070 and the input device 1080), or any other device operative to interact with the computing system 1000, such as any device operative to act as an interface between a user and the computing system 1000.

In one aspect, RAID controllers (e.g., RAID controller 140) may implement a write journaling mechanism to update an LD stripe in a consistent way using write journals, so that all the new data blocks and the parity blocks are updated in an atomic way (e.g., either (1) all the new data blocks and the parity blocks are updated together or (2) none of the new data blocks nor parity blocks updated). In case the RAID process (e.g., a write operation) is interrupted because of a controller failure and/or disk failures, the write journals can be used to make the LD stripes consistent. There are some limitations with the existing write journal mechanisms as described in the following section.

Generally, battery backup may be performed in RAID controllers to keep the data and write journal data. In case battery backup is not available or is not properly performed, then the write journal data may be at risk of loss in controller power loss scenarios. RAID controllers that do not have a big cache memory (e.g., DRAM (dynamic random access memory)) do not have any way to retain write journal data. As an alternative, RAID controllers may maintain write journal data (without maintaining actual data) in a controller persistent memory (e.g., nvSRAM (non-volatile static random access memory)). However, such persistent memory may be limited in size. Moreover, maintaining only write journal data in such controller persistent memory may be at the risk of losing or corrupting data in case of a double failure, e.g., a disk failure following a (RAID) controller power failure. In case of a double failure, the parity may be in an inconsistent state, and inconsistent parity cannot be reliably used for recovery. Furthermore, a permanent controller failure (e.g., in case a replacement is needed) may lead to a complete loss of write journal data in the existing write journal mechanisms.

To solve this problem, according to certain aspects, embodiments in the present disclosure relate to a technique to keep or maintain write journal data (or journal information) on disks instead of cache (e.g., DRAM) or persistent memory (e.g., nvSRAM) in a controller. In some embodiments, write journal data may be persisted on the same set of disks on which an LD is created. In some embodiments, a disk space for write journal data may be carved out (or reserved, or kept, or saved) from all the participating disks in an LD. For example, a disk space from all the participating disks in an LD may be used for keeping or saving write journal data.

In some embodiments, a disk (or a device or an arm that is used to form or define an array) may have a layout for write journaling. In some embodiments, the write journaling may be writing or keeping a write-in-progress record or any one or more data records or blocks that keep track of one or more ongoing write transactions. According to the layout, the disk may be divided into portions of data or parity strips (e.g., data strips or parity strips), write journal data strips, write journal metadata blocks, and/or DDF blocks. In some embodiments, data may be located in the order of data or parity strips, write journal data strips, write journal metadata blocks, and DDF blocks using an addressing scheme (e.g., logical block addressing (LBA)), but in other embodiments, data may be located in another order (e.g., in the order of data or parity strips, write journal metadata blocks, write journal data strips, and DDF blocks). In some embodiments, disk LBAs may be grouped into strips based on an LD strip size. For example, if an LD has a 64 KB strip size on a physical device (PD) having a 4 KB-sized LBA, 16 continuous LBAs may be grouped in a single strip. For example, a first data or parity strip of the data or parity strips (e.g., data or parity strip 0) may be stored at a first LBA, and the last block of the DDF blocks may be stored at the last LBA. The data or parity strips may include (N+1) data or parity strips (N is a positive integer), e.g., data or parity strip 0 to data or parity strip N. The write journal (WJ) data strips may include (M+1) WJ data strips (M is a positive integer), e.g., WJ data strip 0 to WJ data strip M. The WJ metadata blocks may include (M+1) WJ metadata blocks, e.g., WJ metadata block 0 to WJ metadata block M.

In some embodiments, each data or parity strip on a disk may contain user data or parity data (in case of parity RAID LDs). In some embodiments, some of the data or parity strips may be carved out (or reserved, or saved, or kept) for WJ data strips to keep write journal data. For example, a disk space in an LD may be used for keeping, saving or storing WJ data strips to keep write journal data. Each WJ data strip may contain write journal data corresponding to a data or parity strip of an arm or a data row of a span. A data row (or row) may be defined as a block of data in a span (or array) such that the size of the row equals the number of arms per span times the strip size. In some embodiments, a block of data may be a unit for storing data on a storage device using a logical block addressing (LBA), a linear addressing, a logical addressing, a physical addressing or any addressing scheme for the storage device. For example, referring to FIG. 1A, the data strip 151, the strip 152, and the parity strip 153 forms a data row. The number of strips to reserve for WJ data strips may be decided based on the number of outstanding data row writes on an LD. In some embodiments, the number of strips to reserve for WJ data strips may be derived from the number of outstanding host I/Os (Inputs/Outputs) for a write through LD (e.g., writing data to both a RAID cache and a disk) or the number of outstanding row flushes for a write back LD (e.g., writing data to a RAID cache and writing the data to a disk later or when necessary).

In some embodiments, a WJ metadata block may be reserved for each of the WJ data strips. The WJ metadata block may keep, maintain or store metadata information of the write journal data stored in the corresponding WJ data strip. The WJ metadata block may include (1) an LD number, (2) mapping information of the WJ data strip to the corresponding data or parity strips (in a span), and/or (3) validity information on blocks in the data or parity strips that are participating in the write journal for all the disks (or arms) of the span. The validity information may include whether each LBA block is dirty (e.g., corrupt or not valid or not up-to-date) or valid (e.g., up-to-date). The WJ metadata blocks may be replicated on all the disks (or arms) participating in the span (or array). In other words, each arm (or disk) of the span may include the same WJ metadata blocks, in order to tolerate disk failures for redundant LDs.

For example, in a layout of an LD across all participating arms (or disks) for configuration of a RAID 5 LD with 2 spans, each span including 3 arms (or disks), each arm of the first span may be divided into portions of data or parity strips, write journal data strips, WJ metadata blocks, and/or DDF blocks. The data or parity strips in each arm may include (N+1) data or parity strips (N is a positive integer), e.g., data or parity strip 0 to data or parity strip N. The WJ data strips in each arm may include (M+1) WJ data strips (M is a positive integer), e.g., WJ data strip 0 to WJ data strip M. Each WJ data strip may contain write journal data corresponding to a data or parity strip of an arm or a data row of a span. The WJ metadata blocks in each arm may include (M+1) WJ metadata blocks, e.g., WJ metadata block 0 to WJ metadata block M. A WJ metadata block may be reserved for each of the WJ data strips. The WJ metadata block may keep, maintain or store metadata information of the write journal data stored in the corresponding WJ data strip. The WJ metadata blocks in one arm may be replicated on all the other arms participating in the span. In other words, each arm of the span may include the same WJ metadata blocks, in order to tolerate disk failures for redundant LDs. The second span may have the same layout as that of the first span.

In some embodiments, WJ metadata blocks may provide metadata information for the corresponding WJ data strips. WJ metadata blocks and WJ data strips may be mapped one-to-one. For example, WJ metadata block k (k is an integer such that 0≤k≤M) on a disk may keep, maintain, contain, or store metadata information for the corresponding WJ Data strip k. Each metadata block may be either in an open state (also referred to as each metadata block being "open") or in a closed state (also referred to as each metadata block being "closed"). A WJ metadata block may be in an open state if there is an outstanding (e.g., remaining to be completed) host I/O (e.g., write) on a data row corresponding to the WJ metadata block. A WJ metadata block may be in a closed state if there is no outstanding host I/O on a data row corresponding to the WJ metadata block.

In some embodiments, a WJ metadata block may include the fields of (1) WJ metadata block number, (2) WJ index, (3) LD ID, (4) LD span, (5) user data stripe number, and/or (6) validity information on blocks of data strips in a span (e.g., whether each LBA block is dirty or valid) in the data or parity strips that are participating in the write journal for all the arms of the span. In some embodiments, the validity information field may include a bitmap per arm (e.g., three bitmaps if there are three arms in a span). A bitmap for a particular arm may include a plurality of bits corresponding to the number of LBAs in the data strip portion of the particular arm. The bitmap may specify which LBAs on the particular arm is having valid data or parity that needs to be written to the corresponding arm (or disk) as part of write journal replay. In some embodiments, the bitmap may set the bits corresponding to the LBAs having valid data or parity, to a particular value (e.g., a value of "1"), and set the bits corresponding to the LBAs having dirty data or parity, to another value (e.g., a value of "0"). For example, a WJ metadata block (for a write journal) in an open state, may include a logical disk (LD) identifier in the LD ID field, an LD span number in the LD span field, an LD user data stripe number for which the write journal is in open state in the user data stripe number field. If the span includes three arms (arm 0, arm 1, arm 2), the WJ metadata block in the open state may include a bitmap for arm 0 (e.g., arm[0]), a bitmap for arm 1 (e.g., arm[1]), and a bitmap for arm 2 (e.g., arm[2]). On the other hand, a WJ metadata block (for a write journal) in a closed state, may include a particular value (e.g., "Invalid LD ID") in the LD ID field, and include a value indicating "not available" or "null" in the fields of LD span, user data stripe number, and bitmaps. The content in a WJ metadata block may be replicated or mirrored on all the arms in a span, in order to keep the journal intact in case of any arm failures at a LD span level. For example, the WJ metadata blocks on arm 0 may be replicated to arm 1 and arm 2 as well, while the content of WJ data strips in one arm may be different from the content of WJ data strips in another arm. WJ metadata block 0 in arm 0 is the same as WJ metadata block 0 in arm 1 and WJ metadata block 0 in arm 2.

In one approach, a write journaling system may update a user data stripe (e.g., a block of user data across all spans) using a stripe update process. At a first step of the stripe update process, the system may read old data of the stripe (in case of read-modify-write) or peer data of the stripe (in case of read-peers) and calculate parity data for the user data stripe in an LD span. At a second step of the stripe update process, the system may find and select a free WJ metadata block for the LD span. At a third step of the stripe update process, the system may issue one or more write commands for writing new data and calculated parity data to the WJ data strips corresponding to the WJ metadata block selected in the second step. The system may wait for these write commands to complete. At a fourth step of the stripe update process, the system may update or write the WJ metadata block (as selected in the second step) with metadata information on a write journal for the new data. The system may wait for this write (to the WJ metadata block) to complete. Upon completion, the system may consider or indicate the write journal to be in an open state. At a fifth step of the stripe update process, the system may issue one or more write commands for writing the new data and the calculated parity data to user data strips (relating to the user data stripe) in the LD span. At a sixth step of the stripe update process, the system may update the WJ metadata block with "INVALID LD ID" to change the write journal to a closed state.

In one approach, in case a RAID controller crashes or an LD state changes to offline because of disk or enclosure removals between stripe writes, for example, user data stripes may be left in an inconsistent state. In this case, a write journaling system may perform a controller recovery or an LD recovery using open write journals to make such user data stripes consistent. The system may use a journal recovery process to scan open write journals and perform a recovery using the open write journals. At a first step of the journal recovery process, for each LD span, the system may read WJ metadata blocks. At a second step of the journal recovery process, the system may find WJ metadata blocks that have write journals in an open state. At a third step of the journal recovery process, for each arm relating to the open journals, the system may use the metadata information contained in the WJ metadata blocks to generate disk write commands to (1) read valid arm LBAs from the WJ data strip and (2) write the read LBAs to the data strip present in the metadata information. At a fourth step of the journal recovery process, the system may update the WJ metadata block with "INVALID LD ID" to change the write journal to a closed state.

In one approach, in a case in which disk failures or media corruption may lead to the loss of write journal information, a write journaling system may perform a journal error handling to safe guard against such problems. In some embodiments, the system may replicate WJ metadata blocks on all the arms of a span such that the write journal information can be available as long as enough arms (or disks) are available to keep the LD as online or in a degraded state. In case a WJ metadata block in one arm develops a media error, as the WJ metadata block is replicated on all the arms in a span, the system may use the same WJ metadata block from another arm.

Embodiments in the present disclosure have at least the following advantages and benefits. First, embodiments in the present disclosure can provide useful techniques for write journaling that may not require a battery backup solution by keeping, maintaining or storing write journal information on the same set of arms (or disks) on which an LD is created.

Second, embodiments in the present disclosure can provide useful techniques for write journaling that may not require DRAM based cache memory by keeping, maintaining or storing write journal information on arms (or disks) which are not limited by size compared to DRAM.

Third, embodiments in the present disclosure can provide useful techniques for write journaling that can keep, maintain or store both data and write journal metadata for the data on disks (or arms) so as to make the user data stripes consistent in various kinds of failure (e.g., a controller power failure, a disk failure, a disk failure following a controller power failure).

Fourth, embodiments in the present disclosure can provide useful techniques for write journaling that may not keep write journal information in a RAID controller and still can fix the parity in case of a controller failure.

Fifth, embodiments in the present disclosure can provide useful techniques for write journaling that may not significantly increase the number of I/Os to a disk to maintain journal information. Therefore, the write journaling techniques can be performed better in solid state drives (SSDs) than hard disk drives (HDDs).

Figure 2:
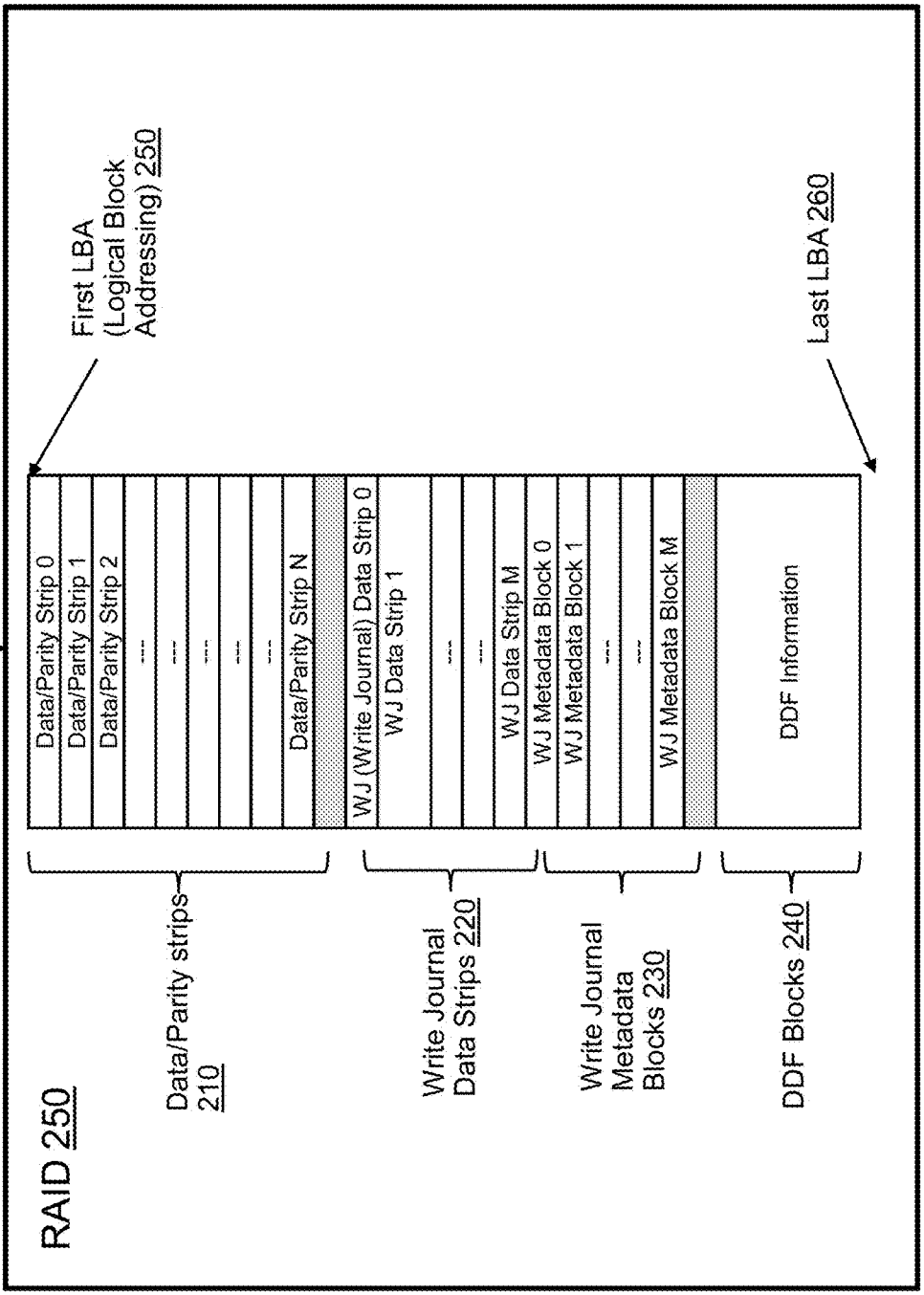
FIG. 2 is a schematic block diagram of a system for performing on-disk write journaling, in accordance with an embodiment.

FIG. 2 is a schematic block diagram of a system 200 for performing on-disk write journaling, in accordance with an embodiment. The system 200 may include a RAID controller 240, and RAID 250. Each of the RAID controller 240 and the RAID 250 may, but need not, have a configuration similar to that of a computing system in FIG. 1. Among other potential differences, RAID Controller 240 and RAID 250 need not have all the components discussed with regard to that computing system. In the RAID 250, a disk (or an arm of an array) may be divided into portions of data or parity strips 210, write journal (WJ) data strips 220, WJ metadata blocks, and/or DDF blocks 240. In some embodiments, data may be located in the order of data or parity strips, WJ data strips, WJ metadata blocks, and DDF blocks using an addressing scheme (e.g., LBA), but in other embodiments, data may be located in another order (e.g., in the order of data or parity strips, WJ metadata blocks, WJ data strips, and DDF blocks). In some embodiments, disk LBAs may be grouped into strips based on an LD strip size. For example, if an LD has a 64 KB strip size on a physical device (PD) having a 4 KB-sized LBA, 16 continuous LBAs may be grouped in a single strip. For example, referring to FIG. 2, data or parity strip 0 may be stored at a first LBA 250, and the last block of the DDF blocks may be stored at the last LBA 260. The data or parity strips 210 may include (N+1) data or parity strips (N is a positive integer), e.g., data or parity strip 0 to data or parity strip N. The WJ data strips may include (M+1) WJ data strips (M is a positive integer), e.g., WJ data strip 0 to WJ data strip M. The WJ metadata blocks may include (M+1) WJ metadata blocks, e.g., WJ metadata block 0 to WJ metadata block M.

Referring to FIG. 2, each data or parity strip 0-N may contain user data or parity data. Each WJ data strip 0-M may contain write journal data corresponding to a data or parity strip of an arm to keep write journal data. For example, WJ data strip 0 may contain write journal data corresponding to data or parity strip 2. In some embodiment, the write journal data contained in a WJ data strip may include the same content as the corresponding data or parity strip. The number of strips to reserve for WJ data strips (e.g., number M) may be decided based on the number of outstanding data row writes on an LD. In some embodiments, the number of strips to reserve for WJ data strips may be derived from the number of outstanding host I/Os for a write through LD or the number of outstanding row flushes for a write back LD.

Referring to FIG. 2, a WJ metadata block (e.g., WJ metadata block 0-M) may be reserved for each of the WJ data strips 0-M. The WJ metadata block may keep, maintain or store metadata information of the write journal data stored in the corresponding WJ data strip. For example, WJ metadata block k ($0 \le k \le M$) may keep, maintain or store metadata information of the write journal data stored in WJ data strip k. Each WJ metadata block may include (1) an LD number, (2) mapping information of the WJ data strip to the corresponding data or parity strips (in a span), and/or (3) validity information on blocks (e.g., whether each LBA block is dirty or valid) in the data or parity strips that are participating in the write journal for all the disks (or arms) of the span. Details of WJ metadata layout will be described below with reference to FIGS. 4A and 4B.

Figure 3:
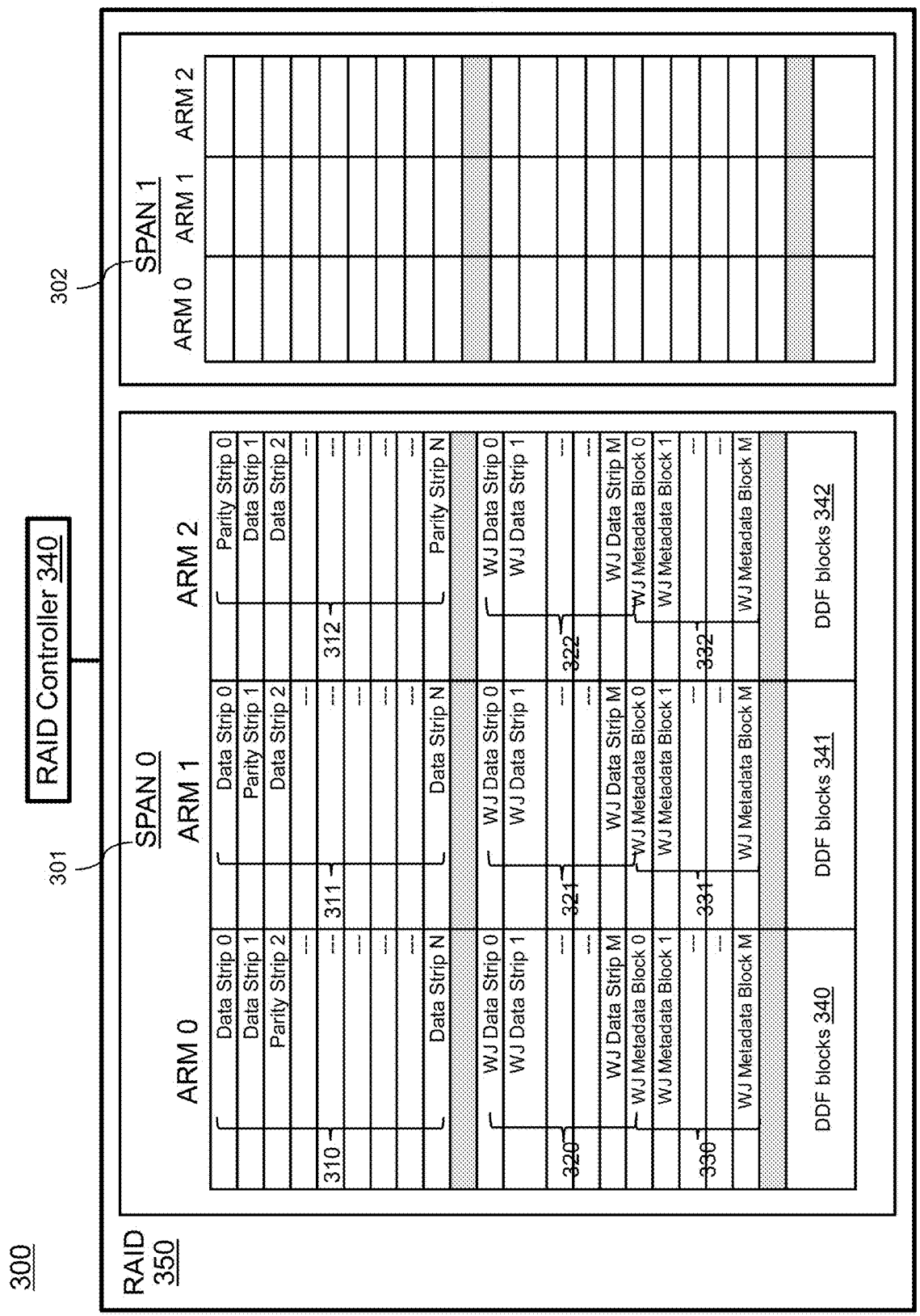
FIG. 3 is a schematic block diagram of a system for performing on-disk write journaling, in accordance with an embodiment.

FIG. 3 is a schematic block diagram of a system for performing on-disk write journaling, in accordance with an embodiment. The system 300 may include a RAID controller 340, and RAID 350. Each of the RAID controller 340 and the RAID 350 may have a configuration similar to that of a computing system in FIG. 1B. The RAID controller and the RAID may not necessarily match the computing system in FIG. 1B, may not necessarily contain all the components described with regard to the computing system in FIG. 1B, and may contain other components and different connections that are not described with regard to the computing system in FIG. 1B. For instance, RAID controller and the RAID may or may not have displays or input devices. The RAID 150 may include a single span 3 disk RAID 5 logical device (LD). That is, the RAID 150 may a RAID 5 LD with 2 spans (span 0 (301) and span 1 (302)), each span including 3 arms (arm 0, arm 1, arm 2) such that a single span can form an LD. FIG. 3 shows a layout of the LD across all participating arms (or disks) (arm 0, arm 1, arm 2) in the span 301. The span 302 may have a layout that is the same as, or similar to, that of the span 301.

Referring to FIG. 3, each arm of span 0 (arm 0, arm 1, arm 2) may be divided into portions of data or parity strips 310, 311, 312, write journal data strips 320, 321, 322, WJ metadata blocks 330, 331, 332, and/or DDF blocks 340, 341, 342. The data or parity strips in each arm may include (N+1) data or parity strips (N is a positive integer), e.g., data or parity strip 0 to data or parity strip N. The WJ data strips in each arm may include (M+1) WJ data strips (M is a positive integer), e.g., WJ data strip 0 to WJ data strip M. Each WJ data strip may contain write journal data corresponding to a data or parity strip of an arm or a data row of a span. For example, referring to FIG. 3, WJ data strip 0 in arm 0, WJ data strip 0 in arm 1, and WJ data strip 0 in arm 2 may respectively contain write journal data corresponding to parity strip 2 in arm 0, data strip 2 in arm 1, and data strip arm 2, which can form a row 2 (or data row) in the span 301. The WJ metadata blocks in each arm (e.g., arm 0, arm 1, arm 2) may include (M+1) WJ metadata blocks, e.g., WJ metadata block 0 to WJ metadata block M. A WJ metadata block may be reserved for each of the WJ data strips. WJ metadata blocks and WJ data strips may be one-to-one mapped. For example, WJ metadata block k (0≤k≤M) may keep, maintain or store metadata information of the write journal data stored in WJ data strip k. The WJ metadata blocks in one arm (e.g., arm 0 in the span 301) may be replicated on all the other arms participating in the span (e.g., arm 1 and arm 2 in the span 301). In other words, each arm of the span may include the same WJ metadata blocks, in order to tolerate disk failures for redundant LDs. The number of strips to reserve for WJ data strips (or the number of WJ metadata blocks) may be decided based on the number of outstanding data row writes on an LD. In some embodiments, the number of strips to reserve for WJ data strips may be derived from the number of outstanding host I/Os (Inputs/Outputs) for a write through LD or the number of outstanding row flushes for a write back LD.

Referring to FIG. 3, the WJ metadata blocks in each arm (e.g., arm 0, arm 1, arm 2) in the span 301 may include (1) an LD number, (2) mapping information of the WJ data strip to the corresponding data or parity strips (in the span 301), and/or (3) validity information on blocks (e.g., whether each LBA block is dirty or valid) in the data or parity strips that are participating in the write journal for all the arms of the span 301. Each WJ metadata block may be either in an open state or in a closed state. A WJ metadata block may be in an open state if there is an outstanding (e.g., remaining to be completed) host I/O (e.g., write) on a data row corresponding to the WJ metadata block. A WJ metadata block may be in a closed state if there is no outstanding host I/O on a data row corresponding to the WJ metadata block. Details of WJ metadata layout will be described below with reference to FIGS. 4A and 4B.

Figure 4A:
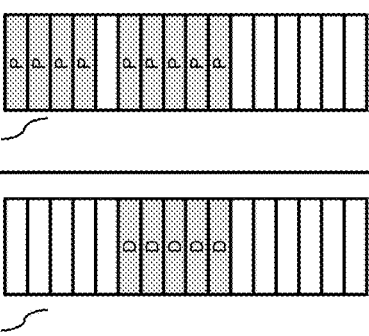

FIG. 4A and FIG. 4B are a schematic block diagram of a layout 400 of WJ metadata blocks 0-M (410-0, . . . , 410-M; collectively 410) for write journals, in accordance with an embodiment. A WJ metadata block may include the fields of (1) WJ metadata block number 420, (2) WJ index 430, (3) LD ID 440, (4) LD span 450, (5) user data stripe number 460, and/or (6) validity information 405 on blocks of data strips in a span (e.g., whether each LBA block is dirty or valid) in the data or parity strips (e.g., data or parity strips 0-N in FIG. 3) that are participating in the write journal for all the arms of the span (e.g., arm 0, arm 1, arm 2 of the span 301 in FIG. 3). In some embodiments, the WJ metadata block number field 420 of a WJ metadata block may identify the WJ metadata block (e.g., LBA address). The LD ID field 440 may identify the LD that the WJ metadata block belongs to. The LD span field 450 may identify the span the WJ metadata block belongs to (e.g., span 301 in FIG. 3). The WJ index 430 may identify WJ data strips corresponding to the WJ metadata block in the corresponding span. For example, referring to FIG. 3, the WJ metadata block 410-1 may have WJ index "1" corresponding to the WJ data strips 1 in the span 301 (e.g., WJ data strip 1 in arm 0, WJ data strip 1 in arm 1, WJ data strip 1 in arm 2). The user data stripe number field 460 may identify a data or parity corresponding to the WJ metadata block in the corresponding span. For example, referring to FIG. 3, the WJ metadata block 410-1 may have user data stripe number "2" corresponding to the data or parity strips 2 in the span 301 (e.g., parity strip 2 in arm 0, data strip 2 in arm 1, data strip 2 in arm 2).

Referring to FIG. 4A and FIG. 4B, the validity information field 405 may include a bitmap per arm (e.g., three bitmaps fields arm[0] 470, arm[0] 480, and arm[2] 490 corresponding to arm 0, arm 1, and arm 2). A bitmap for a particular arm may include a plurality of bits (e.g., 16 bits) corresponding to the number of LBAs in the data strip identified by the user data stripe number 460 (e.g., 16 4 KB LBAs, forming a 64 KB data strip) in the particular arm. The bitmap may specify which LBAs of the data strip in the particular arm is having valid data or parity that needs to be written to the corresponding arm as part of write journal replay. In some embodiments, the bitmap may set the bits corresponding to the LBAs having valid data or parity, to a particular value (e.g., a value of "1"), and set the bits corresponding to the LBAs having dirty data or parity, to another value (e.g., a value of "0"). For example, the WJ metadata block 410-1 may include a bitmap arm[0] 470-1 for arm 0 of span 0 (e.g., span 301 in FIG. 3), a bitmap arm[1] 480-1 for arm 1 of span 0, and a bitmap arm[2] 490-1 for arm 2 of span 0. The bitmap 470-1 may indicate that the third LBA of the data strip 1 in the arm 0 of span 0 (see FIG. 3) is having valid data and other LBAs of the data strip 1 in the arm 0 of span 0 are having dirty data. The bitmap 480-1 may indicate that the third, fifth, ninth LBAs of the parity strip 1 in the arm 1 of span 0 (see FIG. 3) have valid parity and other LBAs of the parity strip 1 in the arm 1 of span 0 have dirty data. The bitmap 490-1 may indicate that the sixth and ninth LBAs of the data strip 1 in the arm 2 of span 0 (see FIG. 3) have valid parity and other LBAs of the data strip 1 in the arm 2 of span 0 have dirty data.

Referring to FIG. 4B, the WJ metadata block 410-M may include a bitmap arm[0] 470-M for arm 0 of span 0, a bitmap arm[1] 480-M for arm 1 of span 0, and a bitmap arm[2] 490-M for arm 2 of span 0. The bitmap 470-M may indicate that all the LBAs of the parity strip 100 in the arm 0 of span 0 have valid data and no LBAs of the parity strip 100 in the arm 0 of span 0 have dirty data. The bitmap 480-M may indicate that all the LBAs of the data strip 100 in the arm 1 of span 0 have valid data and no LBAs of the data strip 100 in the arm 1 of span 0 have dirty data. The bitmap 490-M may indicate that all the LBAs of the data strip 100 in the arm 2 of span 0 have valid data and no LBAs of the data strip 100 in the arm 2 of span 0 have dirty data.

Referring to FIG. 4A and FIG. 4B, a WJ metadata block in an open state (e.g., WJ metadata block 410-0) may include an LD identifier (e.g., 0) in the LD ID field 440, an LD span number (e.g., 0) in the LD span field 450, an LD user data stripe number (e.g., 0) for which the write journal is in open state in the user data stripe number field 460. If the span includes three arms (arm 0, arm 1, arm 2), the WJ metadata block in the open state (e.g., WJ metadata block 410-0) may include a bitmap for arm 0 (e.g., bitmap 470-0), a bitmap for arm 1 (e.g., bitmap 480-0), and a bitmap for arm 2 (e.g., bitmap 490-0). On the other hand, a WJ metadata block in a closed state (e.g., WJ metadata block 410-2) may include a particular value (e.g., "Invalid LD ID") in the LD ID field 430, and include a value indicating "not available" or "null" in the fields of LD span 440, user data stripe number 450, and bitmaps 460, 470, 480. The content in a WJ metadata block may be replicated or mirrored on all the arms (e.g., arm 0, arm 1, arm 2) in a span, in order to keep the journal intact in case of any arm failures at a LD span level. For example, the WJ metadata blocks on arm 0 (e.g., WJ metadata blocks 330) may be replicated to arm 1 (e.g., WJ metadata blocks 331) and arm 2 (e.g., WJ metadata blocks 332) as well, while the content of WJ data strips in one arm (e.g., data or parity strips 310) may be different from the content of WJ data strips in another arm (e.g., data or parity strips 311, data or parity strips 312). WJ metadata block 0 in arm 0 may be the same as WJ metadata block 0 in arm 1 and WJ metadata block 0 in arm 2.

Figure 5:
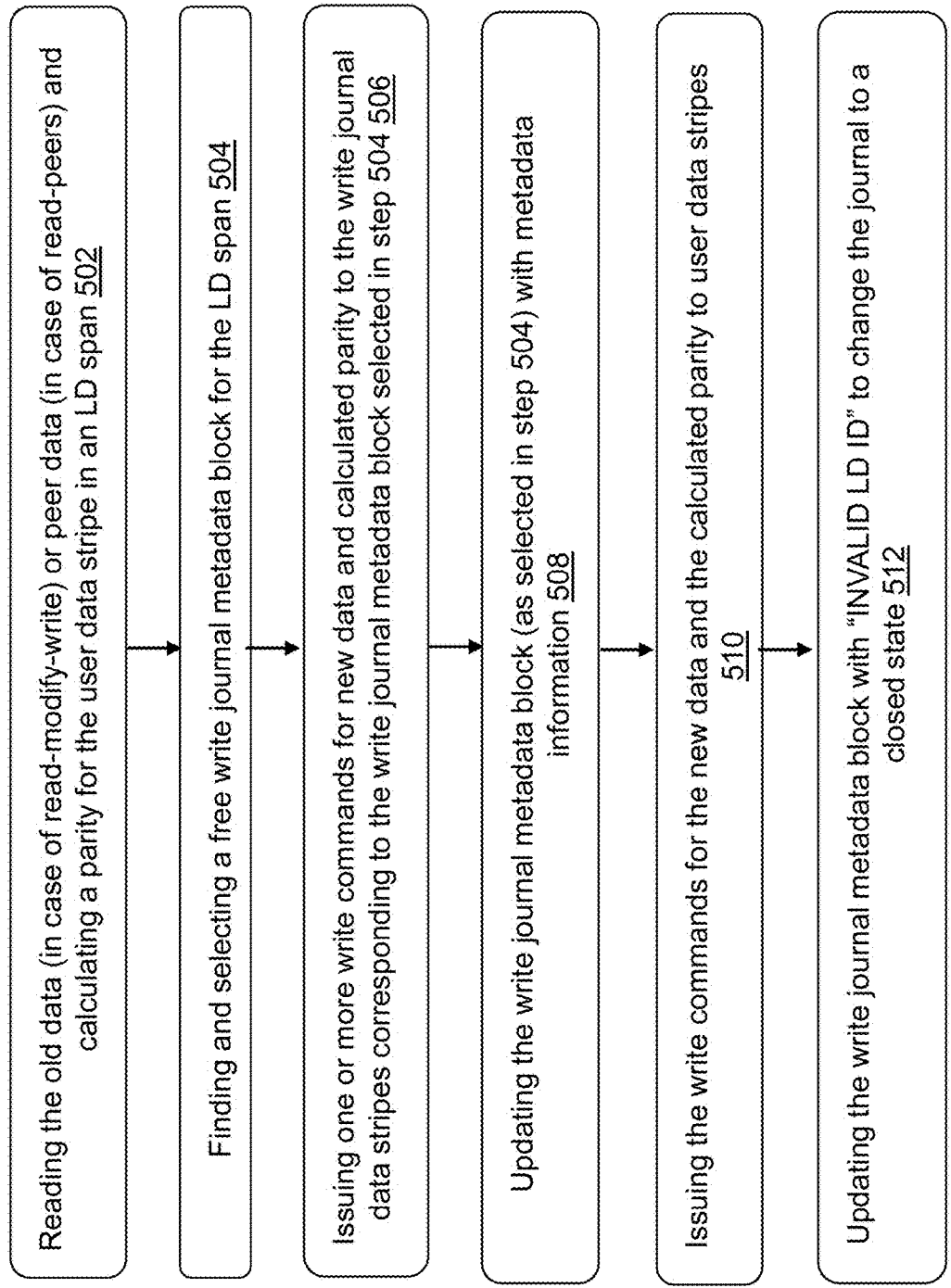
FIG. 5 is a flow diagram showing a process for writing new data on a disk, in accordance with an embodiment.

FIG. 5 is a flow diagram showing a process 500 for writing new data on a disk, in accordance with an embodiment. In some embodiments, a write journaling system (e.g., write journaling system 200 or 300) may update a user data stripe using a stripe update process. In some embodiments, the user data stripe may be a block of user data across all spans (e.g., user data stripe 0 including data or parity strips 0 in arms 0-2 of span 0 and data or parity strips 0 in arms 0-2 of span 1 in FIG. 3).

At step 502, the system may read old data of the stripe (in case of read-modify-write) or peer data of the stripe (in case of read-peers), and calculate parity data for the user data stripe in an LD span (e.g., span 0 in FIG. 3). At step 504, the system may find and select a free WJ metadata block (e.g., WJ metadata block 0) for the LD span.

At step 506, the system may issue one or more write commands for writing new data (e.g., new data for data strip 0 in arm 0) and calculated parity data (e.g., parity data for parity strip 0 in arm 2) to the WJ data strips (e.g., WJ data strip 0 in arm 0 and WJ data strip 0 in arm 2) corresponding to the WJ metadata block (e.g., WJ metadata block 0) selected in step 502. The system may wait for these write commands to complete.

At step 508, the system may update or write the WJ metadata block (e.g., WJ metadata block 0 selected in step 502) with metadata information (e.g., metadata information such as WJ metadata block number 420, WJ index 430, LD ID 440, LD span 450, user data stripe number 460, validity information 405, for WJ metadata block 0 as shown in FIG. 4A) on a write journal for the new data. The system may wait for this write (to the WJ metadata block 0) to complete. Upon completion, the system may consider or indicate the write journal to be in an open state.

At step 510, the system may issue one or more write commands for writing the new data and the calculated parity data to user data strips (relating to the user data stripe) in the LD span. For example, the system may issue one or more write command for writing the new data and the calculated parity data to data strip 0 in arm 0 and parity strip 0 in arm 2, respectively. At step 512, (upon successful completion of the one or more write commands) the system may update the WJ metadata block (e.g., WJ metadata block 0) with "INVALID LD ID" to change the write journal to a closed state.

Figure 6:
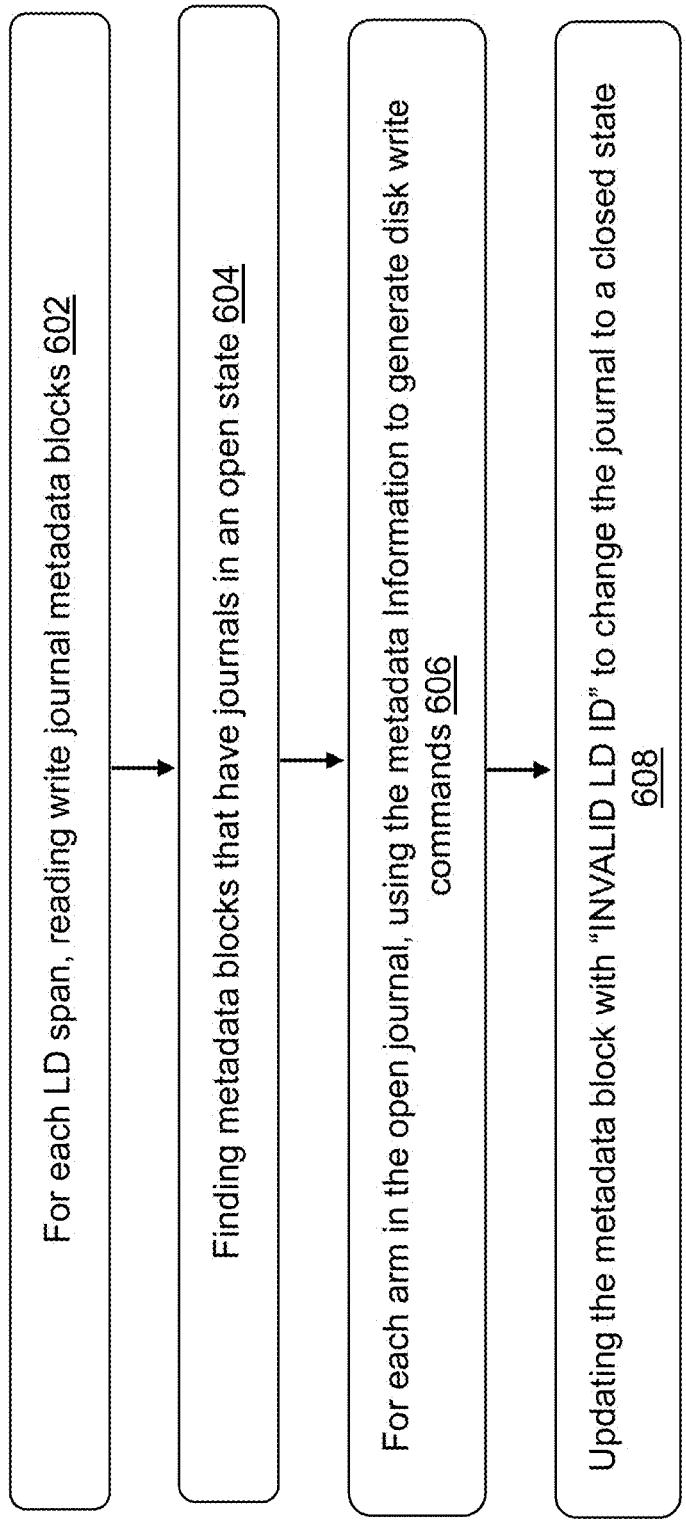
FIG. 6 is a flow diagram showing a process for journal recovery, in accordance with an embodiment.

FIG. 6 is a flow diagram showing a process for journal recovery, in accordance with an embodiment. In case a RAID controller crashes or an LD state changes to offline because of disk or enclosure removals between stripe writes, for example, user data stripes may be left in an inconsistent state. In this case, a write journaling system (e.g., write journaling system 200 or 300) may perform a controller recovery or an LD recovery using open write journals (e.g., WJ data strips or WJ metadata blocks in an open state) to make such user data stripes consistent. The system may use a journal recovery process to scan open write journals (e.g., WJ metadata blocks with the LD ID field 440 having a valid LD ID) and perform a recovery using the open write journals.

At step 602, for each LD span, the system may read WJ metadata blocks (e.g., WJ metadata blocks). At step 604, the system may find WJ metadata blocks that have write journals in an open state (e.g., WJ metadata block 0 whose the LD ID field 440 is set to a valid LD ID as shown in FIG. 4A).

At step 606, for each arm relating to the open journals (e.g., arm 0, arm 1, arm 2 relating to WJ metadata block 0), the system may use the metadata information contained in the WJ metadata blocks to generate disk write commands to (1) read valid arm LBAs from the WJ data strip and (2) write the read LBAs to the data strip present in the metadata information. For example, the system may use the bitmap arm[0] 470-0 to generate disk write commands to (1) read the first to fourth LBAs from WJ data strip 0 in arm 0 and (2) write the read LBAs to data strip 0 in arm 0. The system also may use the bitmap arm[1] 480-0 to generate disk write commands to (1) read the sixth to tenth LBAs from WJ data strip 0 in arm 1 and (2) write the read LBAs to data strip 0 in arm 1. The system also may use the bitmap arm[2] 490-0 to generate disk write commands to (1) read the first-to-fourth LBAs and sixth-to-tenth LBAs from WJ data strip 0 in arm 2 and (2) write the read LBAs to parity strip 0 in arm 2.

At step 608, the system may update the WJ metadata block (e.g., WJ metadata block 0) with "INVALID LD ID" to change the write journal to a closed state. In some embodiments, in a case in which disk failures or media corruption may lead to the loss of write journal information, a write journaling system may perform a journal error handling to safe guard against such problems. For example, the system may replicate WJ metadata blocks on all the arms of a span (e.g., WJ metadata block 0 is replicated on arm 0, arm 1 and arm 2 of span 0) such that the write journal information can be available as long as enough arms (or disks) are available to keep the LD at an online or degraded state. In case a WJ metadata block in one arm (e.g., arm 0) develops a media error, as the WJ metadata block is replicated on all the arms in a span, the system may use the same WJ metadata block from another arm (e.g., arm 2).

Figure 7:
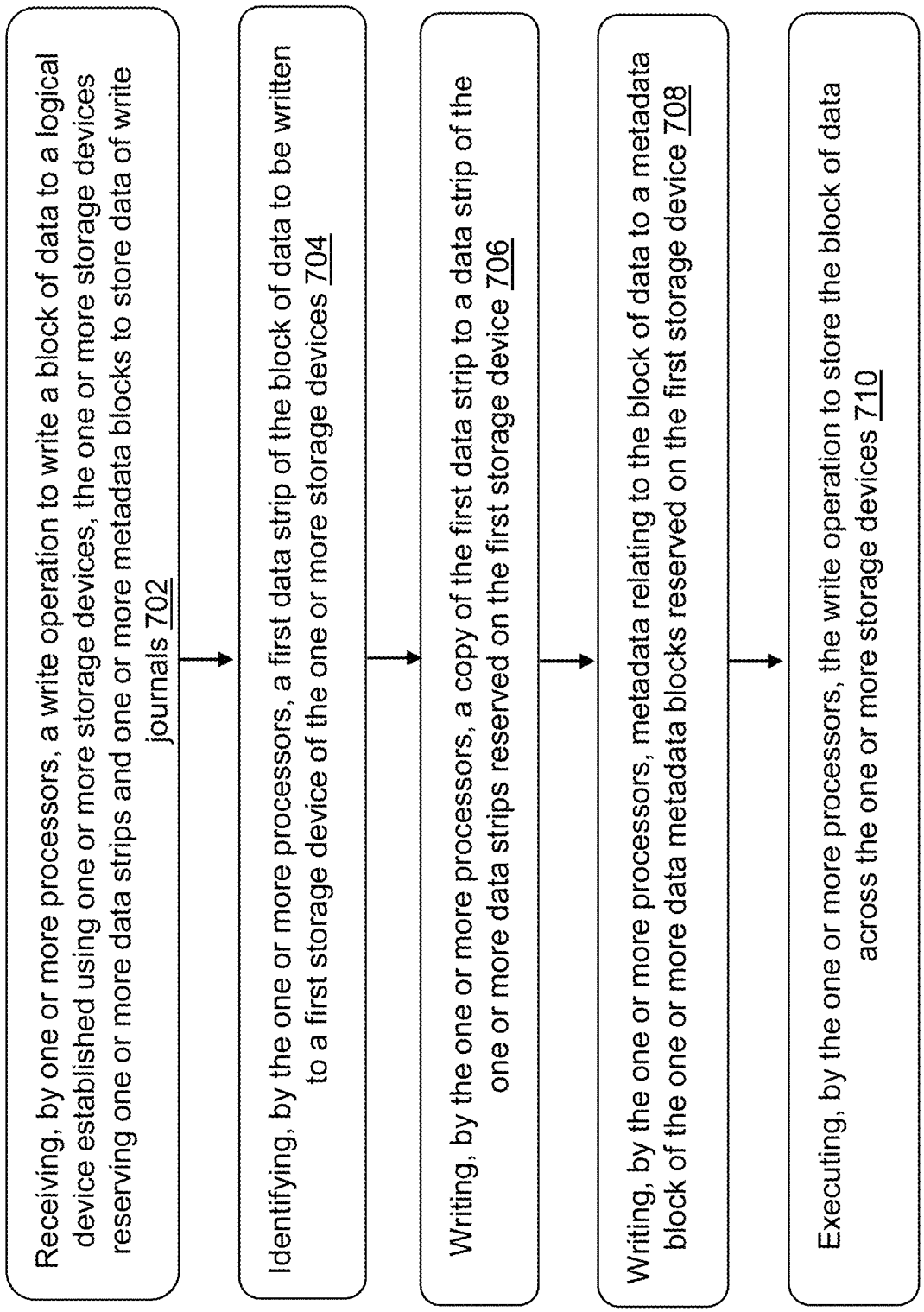
FIG. 7 is a flow diagram showing a process for write journaling on a disk, in accordance with an embodiment.

FIG. 7 is a flow diagram showing a process 700 for write journaling on a disk, in accordance with an embodiment. In some embodiments, the process 700 is performed by one or more processors (e.g. one or more processors of RAID controller 240, 340, or one or more processors of RAID 250, 350). In other embodiments, the process 700 is performed by other entities. In some embodiments, the process 700 includes more, fewer, or different steps than shown in FIG. 7.

At step 702, the one or more processors may receive a write operation (e.g., a write operation command from host 120) to write a block of data (e.g., data row corresponding to data strip 0 in arm 0, data strip 0 in arm 1, and parity strip 0 in arm 2 in FIG. 3) to a logical device (e.g., LD corresponding to span 301) established using one or more storage devices (e.g., arm 0, arm 1, arm 2 in the span 301). In some embodiments, the write operation may be an operation of (or one or more commands for) writing data to a storage device, or an operation of (or one or more commands for) writing data to any device suitable for storing computer readable data. The one or more storage devices may reserve one or more data strips (e.g., WJ data strips 320, 321, 322) and one or more metadata blocks (e.g., WJ metadata blocks 330, 331, 332) to store data of write journals.

At step 704, the one or more processors may identify a first data strip of the block of data (e.g., data strip 0 in arm 0 or parity strip 0 in arm 2 in FIG. 3) to be written to a first storage device (e.g., arm 0 or arm 2 in FIG. 3) of the one or more storage devices. At step 706, the one or more processors may write a copy of the first data strip to a data strip of the one or more data strips (e.g., WJ data strip 0) reserved on the first storage device (e.g., arm 0 or arm 2). At step 708, the one or more processors may write metadata relating to the block of data to a metadata block (e.g., WJ metadata block 0) of the one or more metadata blocks reserved on the first storage device (e.g., arm 0 or arm 2).

At step 710, the one or more processors may execute the write operation to store the block of data (e.g., data row corresponding to data strip 0 in arm 0, data strip 0 in arm 1, and parity strip 0 in arm 2 in FIG. 3) across the one or more storage devices (e.g., arm 0, arm 1, arm 2 in the span 301). In some embodiments, in executing the write operation, the one or more processors may write the first data strip of the block of data at a location of the first storage device (e.g., location 310 or location 312) that is different from a location of the data strip of the one or more data strips (e.g., location 320 or location 322) reserved on the first storage device. In some embodiments, the metadata relating to the block of data may include location information of the block of data (e.g., user data stripe number 460). In some embodiments, the first data strip of the block of data may include one of parity data (e.g., parity strip 0) or non-parity data (e.g., data strip 0).

In some embodiments, the one or more processors may identify a second data strip of the block of data to (e.g., data strip 0 in arm 1) be written to a second storage device (e.g., arm 1) of the one or more storage devices. The one or more processors may write a copy of the second data strip to a data strip of the one or more data strips (e.g., WJ data strip 0 in arm 1) reserved on the second storage device. The one or more processors may write the metadata relating to the block of data to a metadata block of the one or more metadata blocks (e.g., WJ metadata block 0) reserved on the second storage device (e.g., arm 1). In executing the write operation, the one or more processors may write the second data strip of the block of data at a location of the second storage device (e.g., location 311) that is different from a location of the data strip of the one or more data strips (e.g., location 321) reserved on the second storage device. The metadata may include first map data (e.g., arm[0]) identifying which portion of the first storage device (e.g., arm 0) is to be modified due to the write operation, and second map data (e.g., arm[1]) identifying which portion of the second storage device (e.g., arm 1) is to be modified due to the write operation. Each of the first map data and the second map data may be a bitmap (e.g., bitmaps 470-0, 480-0).

In some embodiments, the one or more processors may detect an inconsistent state of the one or more storage devices. In response to the detecting, the one or more processors may determine whether the metadata block is open or closed. For example, a metadata block (e.g., WJ metadata block 410-0) may be in an open state if there is an outstanding (e.g., remaining to be completed) host I/O operation (e.g., write) on a data row corresponding to the metadata block. A metadata block (e.g., WJ metadata block 410-2) may be in a closed state if there is no outstanding host I/O operation on a data row corresponding to the metadata block. In response to determining that the metadata block is open, the one or more processors may read the metadata block (e.g., WJ metadata block 410-0) to obtain location information (e.g., "0" from the WJ index field 430) of the copy of the first data strip (e.g., WJ data strip 0) and the copy of the second data strip (e.g., WJ data strip 1) stored in the first storage device (e.g., arm 0) and the second storage device (e.g., arm 1), respectively. The one or more processors may write, based on the location information, the copy of the first data strip to the first storage device and the copy of the second data strip to the second storage device. In response to writing the copy of the first data strip and the copy of the second data strip, the one or more processors may indicate the metadata block as closed (e.g., setting the LD ID field 440 to "Invalid LD ID").

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining (for both terms "coupled" and "electrically coupled") may be stationary (e.g., permanent or fixed) or moveable (e.g., removable or releasable). Such joining (for both terms "coupled" and "electrically coupled") may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It should be noted that certain passages of this disclosure can reference terms such as "first" and "second" in connection with strips, block of data, data rows, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
   one or more processors configured to:
   receive a write operation to write a block of data to a logical device established using a plurality of storage devices, the plurality of storage devices reserving one or more data strips and one or more metadata blocks to store data of one or more write journals, wherein the one or more metadata blocks, reserved on one of the plurality of storage devices, are replicated on another of the plurality of storage devices wherein each of the plurality of storage devices includes the same one or more metadata blocks,
   identify a first data strip of the block of data to be written to a first storage device of the plurality of storage devices,
   write a copy of the first data strip to a data strip of the one or more data strips reserved on the first storage device,
   write metadata relating to the block of data to a metadata block of the one or more metadata blocks reserved on the first storage device,
   execute the write operation to store the block of data across the plurality of storage devices,
   write a copy of a second data strip to a data strip of the one or more data strips reserved on a second storage device of the plurality of storage devices,
   write the metadata relating to the block of data to a metadata block of the one or more metadata blocks reserved on the second storage device,
   detect an inconsistent state of the plurality of storage devices;
   in response to detection of the inconsistent state of the plurality of storage devices, determining that the metadata block of the one or more metadata blocks reserved on the first storage device or the second storage device is open;
   in response to determining that the metadata block of the one or more metadata blocks reserved on the first storage device or the second storage device is open, read the metadata block that is open to obtain location information of the copy of the first data strip and the copy of the second data strip stored in the first storage device and the second storage device, respectively; and
   write, based on the location information, the copy of the first data strip to the first storage device and the copy of the second data strip to the second storage device.

2. The system of claim 1, wherein in executing the write operation, the one or more processors are configured to:
   write the first data strip of the block of data at a location of the first storage device that is different from a location of the data strip of the one or more data strips reserved on the first storage device.

3. The system of claim 1, wherein the metadata relating to the block of data comprises location information of the block of data.

4. The system of claim 1, wherein the first data strip of the block of data includes at least one of parity data or non-parity data.

5. The system of claim 1, wherein in executing the write operation, the one or more processors are configured to:
   write the second data strip of the block of data at a location of the second storage device that is different from a location of the data strip of the one or more data strips reserved on the second storage device.

6. The system of claim 1, wherein the metadata comprises:
   first map data identifying which portion of the first storage device is to be modified due to the write operation; and
   second map data identifying which portion of the second storage device is to be modified due to the write operation.

7. The system of claim 6, wherein each of the first map data and the second map data is a bitmap.

8. The system of claim 1, wherein the one or more processors are configured to:
   in response to writing, based on the location information, the copy of the first data strip and the copy of the second data strip, indicate the metadata block is closed.

9. A method, comprising:
   receiving, by one or more processors, a write operation to write a block of data to a logical device established using a plurality of storage devices, the plurality of storage devices reserving one or more data strips and one or more metadata blocks to store data of one or more write journals, wherein the one or more metadata blocks, reserved on one of the plurality of storage devices, are replicated on another of the plurality of storage devices wherein each of the plurality of storage devices includes the same one or more metadata blocks;
   identifying, by the one or more processors, a first data strip of the block of data to be written to a first storage device of the plurality of storage devices;
   writing, by the one or more processors, a copy of the first data strip to a data strip of the one or more data strips reserved on the first storage device;

writing, by the one or more processors, metadata relating to the block of data to a metadata block of the one or more metadata blocks reserved on the first storage device;

executing, by the one or more processors, the write operation to store the block of data across the plurality of storage devices, writing, by the one or more processors, a copy of a second data strip to a data strip of the one or more data strips reserved on a second storage device of the plurality of storage devices, writing, by the one or more processors, the metadata relating to the block of data to a metadata block of the one or more metadata blocks reserved on the second storage device, detecting, by the one or more processors, an inconsistent state of the plurality of storage devices;

in response to detection of the inconsistent state of the plurality of storage devices, determining that the metadata block of the one or more metadata blocks reserved on the first storage device or the second storage device is open;

in response to determining that the metadata block of the one or more metadata blocks reserved on the first storage device or the second storage device is open, reading, by the one or more processors, the metadata block that is open to obtain location information of the copy of the first data strip and the copy of the second data strip stored in the first storage device and the second storage device, respectively; and writing, by the one or more processors, based on the location information, the copy of the first data strip to the first storage device and the copy of the second data strip to the second storage device.

10. The method of claim 9, wherein executing the write operation comprises:

writing the first data strip of the block of data at a location of the first storage device that is different from a location of the data strip of the one or more data strips reserved on the first storage device.

11. The method of claim 9, wherein the metadata relating to the block of data comprises location information of the block of data.

12. The method of claim 9, wherein the first data strip of the block of data includes at least one of parity data or non-parity data.

13. The method of claim 9, wherein executing the write operation comprises:

writing the second data strip of the block of data at a location of the second storage device that is different from a location of the data strip of the one or more data strips reserved on the second storage device.

14. The method of claim 9, wherein the metadata comprises:

first map data identifying which portion of the first storage device is to be modified due to the write operation; and second map data identifying which portion of the second storage device is to be modified due to the write operation.

15. The method of claim 14, wherein each of the first map data and the second map data is a bitmap.

16. The method of claim 9, further comprising:

in response to writing, based on the location information, the copy of the first data strip and the copy of the second data strip, indicating the metadata block is closed.

* * * * *